United States Patent [19]

Babbitt et al.

[11] Patent Number: 4,535,967
[45] Date of Patent: Aug. 20, 1985

[54] EXPANDING GATE VALVE WITH FLUID-POWERED ACTUATOR

[75] Inventors: Brett A. Babbitt, Katy; Tri C. Le, Missouri City; Bruce P. Noble, Lewisville, all of Tex.

[73] Assignee: Joy Manufacturing Company, Pittsburgh, Pa.

[21] Appl. No.: 568,460

[22] Filed: Jan. 5, 1984

[51] Int. Cl.³ ............................................. F16K 31/12
[52] U.S. Cl. ....................................... 251/54; 251/193
[58] Field of Search ................... 251/54, 48, 73, 193

[56] References Cited

U.S. PATENT DOCUMENTS

| | | | |
|---|---|---|---|
| 1,850,117 | 3/1932 | McMillan | 251/54 X |
| 2,876,789 | 3/1959 | Borden | 251/54 X |
| 3,164,359 | 1/1965 | Dyer et al. | 251/73 X |
| 3,893,652 | 7/1975 | Natho | 251/84 |
| 4,103,863 | 8/1978 | Houlgrane et al. | 251/48 |
| 4,157,169 | 6/1979 | Norman | 251/195 |

*Primary Examiner*—Larry Jones
*Attorney, Agent, or Firm*—Marvin J. Marnock

[57] ABSTRACT

An expanding gate valve (10) provided with a piston type pneumatic powered actuator (40) for opening and closing the valve wherein the actuator piston (54) is adapted to be driven by fluid pressure in one direction to operate the valve but is returned by spring means (63, 64) when the pressure is removed. The actuator includes a hydraulic choke means (71) comprising a hydraulic piston (80) and cylinder (72) wherein the hydraulic piston is fixed to the actuator stem (23) and is provided with an orifice (89) which imposes a constant velocity control on the actuator stroke by producing a throttling effect on the hydraulic fluid moving from one side of the hydraulic piston to the other. The hydraulic cylinder (72) is filled with a fluid which maintains substantially uniform viscosity in the range of minus 40° Centigrade to 204° Centigrade whereby the valve is adapted for consistent operation during rapid cycling conditions. The actuator housing (41, 42) is a sealed unit with the exception of a single opening (69) which exposes one side of the actuator piston (54) to atmospheric pressure but which may serve as an inlet for pressurized fluid to convert the actuator to a double acting piston actuator when the spring force for returning the actuator piston is inadequate.

3 Claims, 2 Drawing Figures

4,535,967

EXPANDING GATE VALVE WITH FLUID-POWERED ACTUATOR

BACKGROUND OF THE INVENTION

This invention relates to expanding gate valves and more particularly to an expanding gate valve provided with a hydraulically choked pneumatic-powered actuator.

In addition to or in place of manual means such as a handwheel, fluid-powered actuators are sometimes used for opening or closing valves. With single stem valves which handle very high pressures, the tremendous forces needed to operate the valve preclude the use of any manual means and require the provision of an automatic operator. Such automatic operators are also widely used for operating a valve in automatic response to sensing of some charged condition as, for example, with safety valves which are incorporated in safety systems.

Hydraulic actuators are generally preferred for subsea applications and where power, small size and reliability are important criteria. However, pneumatic actuators are oftentimes used where a reduction of the flammability hazard is important, where quicker response times are needed, and where pneumatic power is more readily available.

Heretofore, there has been little use of fluid-powered actuators with gate valves of the expanding gate type largely because of the associated problems. Variances in the sealing forces between expanding gate valves, even those of the same kind, usually rules out the adaptability of an actuator with a uniform thrust force for a plurality of valves wherein such variant characteristics are the general rule. INdeed, after repeated use a single valve will change its characteristics such that an actuator adjustment would be necessary. Also, the very large sealing forces of these valves require a very powerful actuator thrust to break the seal and such a powerful thrust can seriously damage the valve components, such as the seal rings or the gate and segment members. Very large springs also need be employed to return the actuator piston upon release of fluid pressure to the actuator and these significantly increase the size, weight and expense of the actuator. Accordingly, gate valves equipped with fluid-powered actuators have almost always been of the slab gate type where valve damage is less likely. Nevertheless, the handling of very high fluid pressures of 20,000 p.s.i. or more, as is characteristic of deep gas and oil wells, has made it very desirable that only gate valves of the expanding gate type be used, and particularly so in safety valves for very high pressure systems. Expanding gate valves, for example, provide an upstream seal which makes it possible to repair the valve while in operation.

Accordingly, it is an object of the invention to provide a valve of the expansible gate type having a pneumatic-powered actuator for opening and closing the valve.

It is another object to provide an expanding gate valve with a hydraulically choked pneumatic-powered actuator which is adapted for opening and closing the valve with reliability and safety.

It is still another object to provide an expanding gate valve having a pneumatic actuator for opening and closing the valve which includes a readily adjustable means for controlling the stroke velocity of the actuator.

It is a further object to provide an expanding gate valve having a pneumatic-powered piston actuator for opening and closing the valve which can be readily converted to a double acting piston actuator to facilitate reciprocation of the piston.

SUMMARY OF THE INVENTION

The invention is directed to an expanding gate valve provided with a piston type pneumatic actuator for opening and closing the valve wherein the actuator piston is adapted to be driven by fluid pressure in one direction to operate the valve but is returned by spring means when the pressure is removed. The actuator includes a hydraulic choke means comprising a hydraulic piston and cylinder wherein the hydraulic piston is fixed to the actuator stem and is provided with an orifice which imposes a constant velocity control on the actuator stroke by producing a throttling effect on the hydraulic fluid moving from one side of the hydraulic piston to the other. The hydraulic cylinder is filled with a fluid which maintains substantially uniform viscosity in the range of minus 40° Centigrade to 204° Centigrade whereby the valve is adapted for consistent operation during rapid cycling conditions. The actuator housing is a sealed unit with the exception of a single opening which exposes one side of the actuator piston to atmospheric pressure but which may serve as an inlet for pressurized fluid to convert the actuator to a double acting piston actuator when the spring force for returning the actuator piston is inadequate.

DETAILED DESCRIPTION OF A PREFERRED EMBODIMENT

Figure 1:
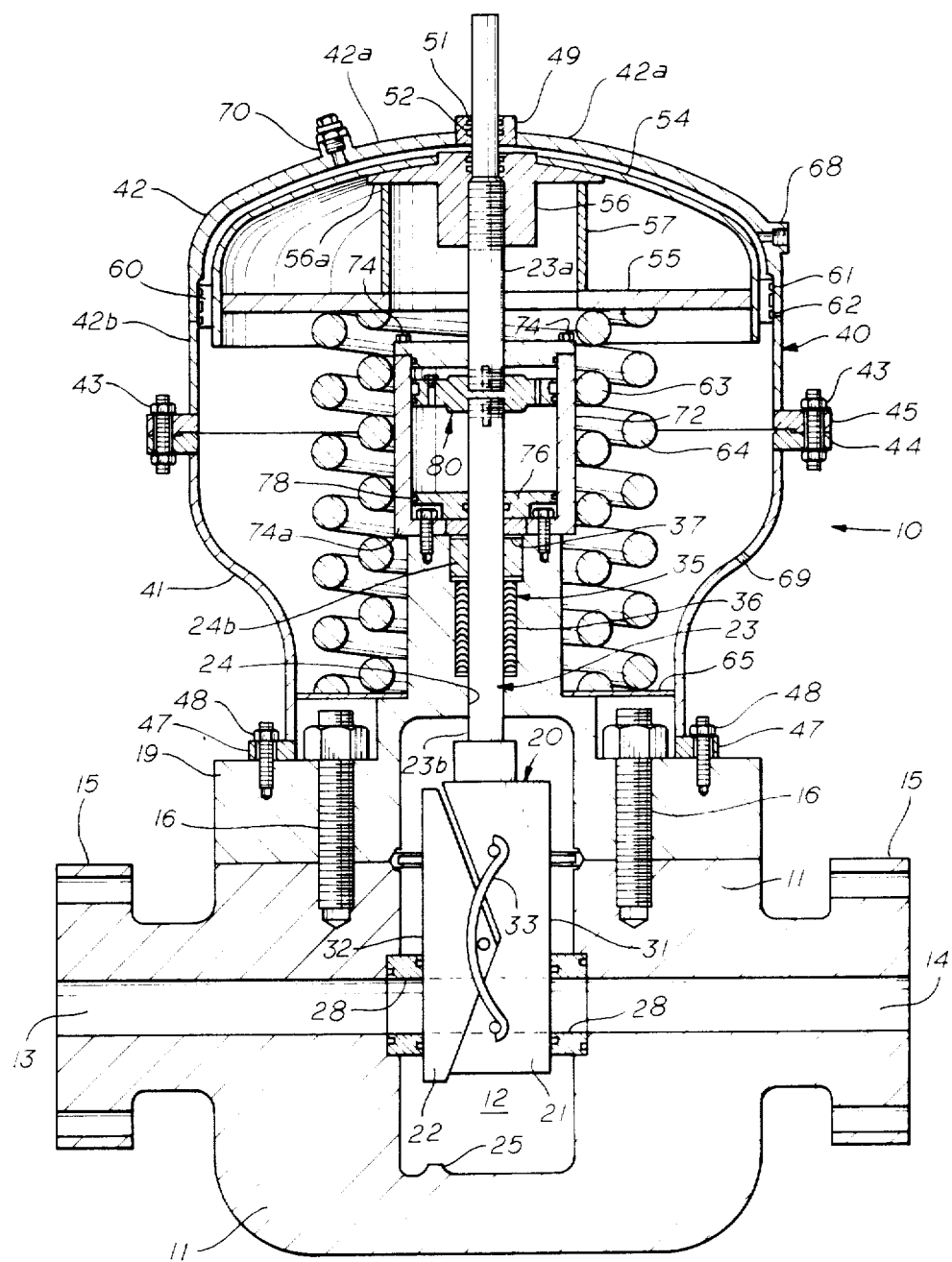
FIG. 1 is a vertical sectional view of an expanding gate valve equipped with a pneumatic-powered actuator having a hydraulic damping means in accordance with the invention.

As shown in FIG. 1, the gate valve 10 of this invention includes a valve body having a valve chamber 12 therein and inlet and outlet flow passages 13, 14 defining a flow way which extends through the valve and intersects the valve chamber 12. End flanges 15, each in surrounding relation to the flow way, are provided on the valve body to accommodate its installation in a flowline. The valve is also provided with a bonnet 19 which is bolted atop the valve body 11 by means of bolts 16 and closes off the valve chamber 12.

The valve 10 further includes a gate assembly 20 of conventional design which is mounted within the valve chamber for sliding movement transversely of the flow way to open or close the valve. The gate asssembly 20 includes a gate member 21 and a segment 22. The gate member 21 is connected at its upper end to the lower end of a valve stem or actuator stem 23 which extends through a central axial bore 24 in the bonnet 19. The stem 23 is comprised of an upper section 23a and a lower section 23b which are axially aligned but not directly connected so as to provide flexibility for purposes to be hereinafter described. The stem 23 is connected to the gate member 21 so that upon actuation of the stem 23 in the axial direction, as will hereinafter be described, the gate assembly 20 is movable across the flow way between a first position wherein the valve is open and a second position wherein the valve is closed.

In the open position of the valve, as shown in FIG. 1, ports 24, 25 in the gate and segment members, respectively, are aligned in registry with the flow passages 13, 14. Also as is conventional, the gate member 21 is provided with a V-shaped recess which accommodates the wedge shaped segment 22, the wedge faces of which conform to the surfaces of the V-shaped recess and are in sliding contact therewith. As is well known to those skilled in the art, the linear movement of the gate assembly to open or close the valve, causes an expansion of the gate assembly in the open and closed positions due to relative sliding movement between the gate member 21 and the segment 22, the relative sliding movement being induced by suitable stop means, such as the stop 25 in the valve chamber 12 or the top of the valve chamber which limits the vertical movement of the segment 22 relative to the gate member 21 as the gate assembly nears its valve open and valve closed positions.

At the inner ends of the flow passages 13, 14, the valve body 11 is provided with annular recesses 26, 27, respectively, surrounding the flow passages 13, 14 in concentric relation therewith and opening into the valve chamber 12. The annular recesses 26, 27 form seat pockets in each of which a valve seat ring 28 is inserted.

For sealing, the gate member 21 is provided with a flat outwardly facing sealing surface 31 which is oriented substantially parallel at all times to a similar sealing surface 32 on the segment 22 which faces in the opposite direction towards the inlet passage 13. When the gate assembly is expanded in the open and closed conditions of the valve, the surfaces 31, 32 establish sealing relationships with the valve seats 28. When in transit between the open and closed positions, the gate assembly assumes a collapsed condition which is induced by a suitable means, such as springs 33 affixed to the sides of the gate and segment members for continuously urging these members to a "nested" relationship wherein the respective apexes of their inner wedge surfaces are aligned.

The gate is connected to the valve stem 23 by any suitable connection but is preferably a low stress stem connection such as shown in U.S. Pat. No. 3,923,285.

The stem 23 extends through the bonnet bore 24 and a packing gland assembly 35 which is mounted in successive enlarged diameter portions 24a, 24b of the bonnet bore 24. Annular packing rings 36 of the packing assembly are disposed in the bore section 24a and provide fluid-tight sealing between the valve bonnet and the valve stem when compressed by the packing adapter 37 which is threaded into the enlargement 24b of the bonnet bore 24.

Actuation of the gate valve 10 is accomplished by a pneumatic actuator 40 which is shown mounted atop the valve body 11. The actuator 40 cpomprises a lower housing member 41 of circular cross section which is bolted to an upper housing member 42 by means of bolts 43 which extend through mating flanges 44, 45 provided, respectively, about the upper end of the lower housing member 41 and the lower end of the upper housing member. An O-ring or gasket between the flanges 44, 45 provides a fluid-tight sealed connection. The bottom end of the lower housing member 41 is narrowed and provided with a radial flange 47 to accommodate its connection to the top of the bonnet 19 by means of flange bolts 48. A gasket or O-ring between the bonnet and flange 47 provides a fluid-tight seal. The upper housing member 42 includes a generally convex top portion 42a which is integrally connected or welded to a straight cylindrical section 42b. A central opening is provided in the top of the upper housing 42 which receives a bushing 49 through which the upper end portion 23a of the valve stem 23 extends. The inner wall of the bushing 49 includes spaced annular grooves with seals 51, 52 therein for sealing against the valve stem 23a which is adapted for axial reciprocating motion therethrough.

The actuator 40 includes a piston assembly having a piston in the form of an inverted bowl-shaped member 54 which is braced by an annular planar member 55 which is welded about its periphery to the inner wall of the bowl-shaped piston 54 in concentric relation to the valve stem 23. A piston retainer 56 is threaded onto an externally threaded portion of the stem 23 and is provided with an upper end portion which fits snugly into the central opening through the piston 54 and is welded therein. A radial flange 56a on the retainer 56 engages the uderside of the piston 54 and is formed with an upper surface conforming in configuration to the underside of the piston. A cylindrical brace 57 couples the retainer 56 to the annular brace 55. The brace 57 is secured to these members by welding.

For sealing engagement with the cylinder wall of the housing section 42b, a sealing ring 60 is welded to the exterior of the lower cylindrical portion of the bowl-shaped piston 54. The sealing ring is provided with external circumferential grooves in its external surface which accommodate sealing members such as O-rings 61, 62.

The piston 54 is biased towards the upper end of the piston housing by a pair of coiled springs 63, 64 which are in sleeved relation to one another and also the upper extension of the bonnet 19. The upper ends of the springs 63, 64 abut the underside of the annular piston brace 55 and the lower ends of the springs abut an annular spring retainer plate 65 which is seated atop the heads of the bonnet bolts 16 and an annular external upward facing shoulder 66 provided on the bonnet 19.

A fluid pressure inlet 68 is provided in the upper piston housing 42 and is internally threaded for accommodating its connection to a pressure conduit leading to a source of pneumatic pressure. As is well known, fluid pressure delivered to the piston housing through the inlet 68 will drive the piston 54 downwardly against the counterforce of the piston springs 63, 64 to where the gate assembly of the valve 20 is moved towards the bottom of the valve chamber 12 and is expanded into sealing engagement with the valve seats 28 to close the valve. When the fluid pressure is bled from atop the piston 54, the springs 63, 64 act to return the piston to its upper position as shown in FIG. 1 wherein the valve is in a "failsafe" open condition.

To facilitate piston operation, a single opening 69 is provided in the lower housing 41 so that the interior of the actuator below the piston is exposed to atmospheric pressure. The opening 69 is adapted to receive a fitting therein and for that reason may be threaded. Also, for safety reasons a pressure relief valve 70 is provided in the top of the upper piston housing 42. It is also to be understood that with the expanding gate valve of FIG. 1, the actuator stop is provided by the gate assembly 20 when it is expanded into tight sealing engagement with the valve seats 28. This occurs when the valve is in the full open and full closed conditions. The initial force required by the actuator to break loose the expanded gate assembly is extremely high and because of such high thrust the valve could be seriously damaged. However, the gate valve 10 and actuator 40 are provided with a hydraulic choke means 71 which imposes a constant velocity control on the actuator stroke and cushions the movement of the gate assembly 20 and the actuator piston 54. The hydraulic choke means 71 includes a hydraulic cylinder 72 which is filled with a hydraulic fluid to be hereinafter described. The cylinder 72 is closed at its upper end by an end plate 73 which is bolted to the end of the cylinder 72 by a plurality of bolts 74. The plate 73 has a central axial opening for receiving the actuator stem therethrough and an O-ring seal in the wall of the opening for sealing against the actuator stem. For additional sealing purposes, an O-ring may be provided in a vertical shoulder of the plate 73 or a thin gasket may be inserted between the plate 73 and the cylinder 72. At its lower end, the cylinder 72 is provided with an inwardly extending radial flange 72a which is provided with a plurality of circumferentially spaced holes for accommodating bolts 75 which connect the hydraulic cylinder to the top end of the bonnet 19.

For sealing the lower end of the cylinder 72, an annular seal plate 76 is seated in the bottom of the cylinder atop the packing adapter 37 which is snugly received in the central axial opening defined by the radial flange 72a of the hydraulic cylinder. The seal plate 76 has a radial flange with a diameter conforming to that of the interior of the cylinder 72. An O-ring 78, or other seal, is accommodated in a circumferential groove formed in the peripheral wall of the seal plate flange to seal the bore of the cylinder 72. A similar O-ring 79 is accommodated in a groove in the wall of the central opening of the plate for establishing a sealing relationship with the actuator stem 23b.

Figure 2:
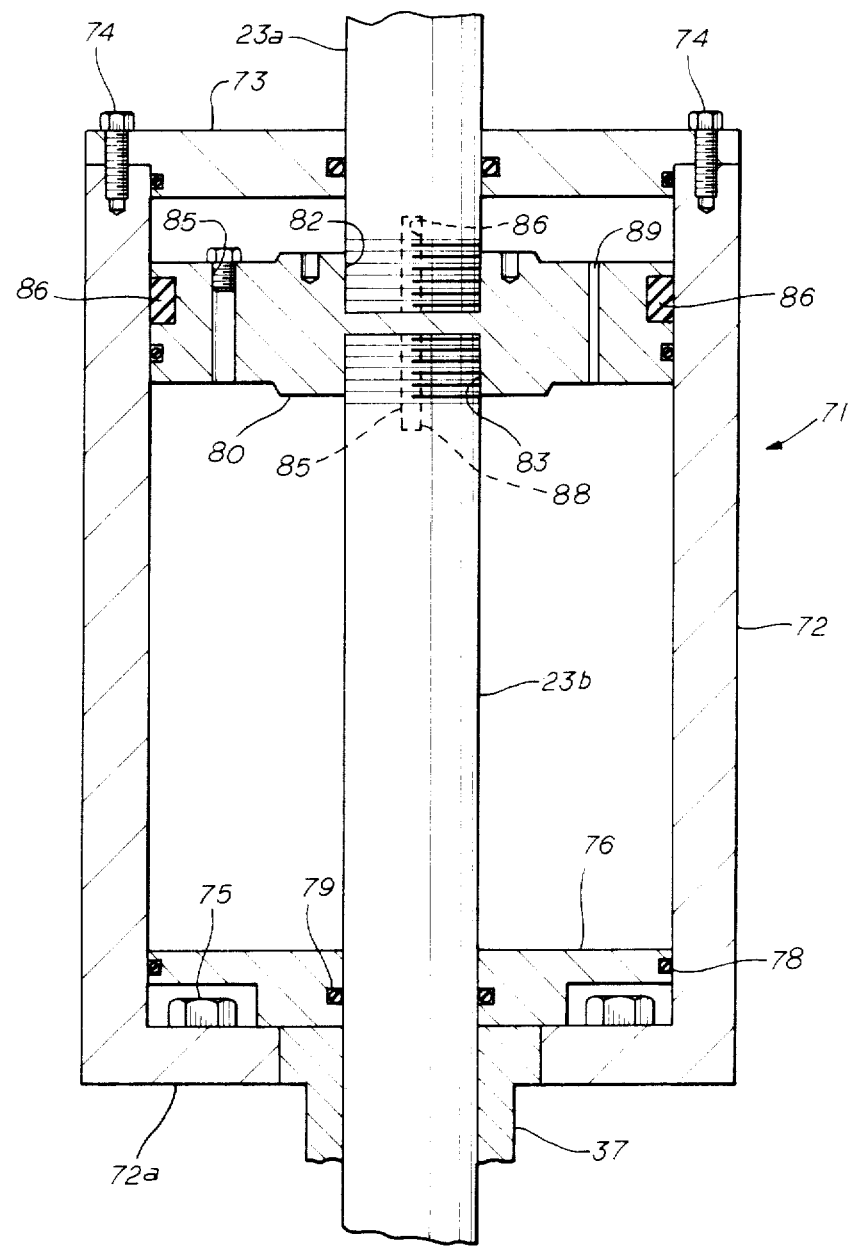
FIG. 2 is an enlarged fragmentary sectional view of the valve of FIG. 1 and showing details of the hydraulic damping device incorporated in the pneumatic actuator.

The hydraulic choke means 71 includes a hydraulic piston 80 which is best seen in FIG. 2. The piston 80 is in the form of an annular plate having an axial bore 81 which includes an upper counterbore 82 extending from the top of the piston 80 and a lower counterbore 83 extending from the bottom face of the piston 80. The wall of counterbore 82 is formed with internal threads for receiving the threaded end of the valve stem extension 23a. Similarly, the counterbore 83 is internally threaded for connecting with the threaded end of the lower section 23b of valve stem 23.

It is also to be seen in FIG. 2, that the lower end of valve stem extension 23a and the upper end of the valve stem section 23b are each provided with a smooth walled blind bore 85, 86, respectively, which extend a limited distance along their longitudinal axes. A connecting pin 88 extends through the bore 81 of the hydraulic piston 80 and is received in the blind bores 85, 86 to facilitate alignment of the stem sections 23a and 23b. The flexibility provided by this connection of the valve stem sections 23a and 23b minimizes the likelihood of binding and galling of the stem and associated valve and actuator components, particularly when a bending moment might be applied to the stem 25 as when the valve and actuator are in other than the vertical position.

For filling the hydraulic cylinder 80 with hydraulic fluid, during assembly, the piston 80 is provided with a fill hole 85 whereby the cylinder can easily be filled with fluid when the top plate 73 is removed and the piston is at the upper end of the cylinder. After filling, the hole 85 is plugged and the cylinder end plate 73 is bolted on. The piston 80 is formed with a wear band groove in its outer periphery which receives a glass-filled belt 86 therein for preventing metal-to-metal rubbing contact between the piston 80 and the hydraulic cylinder 82. It is also provided with a second circumferential groove in its outer periphery which accommodates an elastomer seal such as an O-ring therein. The piston 80 is also provided with a small diameter orifice 89 of approximately 0.125 inch diameter which extends therethrough in the axial direction for stroke velocity control. As is well known, such an orifice meters the flow of hydraulic fluid from one side of the piston 80 to the other and produces a throttling effect which retards the actuator piston and imposes a constant velocity control. Accordingly, the kinetic energy and momentum of the moving components is reduced and consequently, minimizes the shock which occurs at the end of the actuator stroke. This phenomenon occurs at the end of the actuator stroke for either direction of the actuator piston.

The invention is illustrated herein with an expanding gate valve of the rising type which is of the "fail-safe" open variety. It is equally applicable to an expanding gate valve which is of the "fail-safe" closed type. It would not be suitable, of course, for valves with non-rising stems which are subjected to axial rotation in operation.

Another feature of the invention is its ready convertibility to a double acting piston type actuator. Should the sealing force of the expanding gate assembly 20 be so strong in the valve closed position that the springs are inadequate to break the seal and return the actuator piston to the position as shown in FIG. 1, a fitting may be applied to the opening 69 and the actuator housing in the portion thereof below the piston 54 may be pressurized when connected to a source of fluid pressure. In this manner, the piston springs are assisted in breaking loose the gate assembly and returning the actuator piston to the position shown in FIG. 1.

It is also to be understood that rapid cycling of the valve 10 will raise the temperature of the hydraulic fluid in the hydraulic choke means 71 due to friction effects. Accordingly, the hydraulic cylinder 72 is filled with a hydraulic fluid which maintains substantially uniform viscosity over the range of minus 40° Centigrade to 204° Centigrade so that a change in hydraulic fluid temperature has substantially no effect on the actuator stroke. A suitable fluid for this application is a commercially available fluid marketed under the trademark "Mobil Jet Oil II".

It is to be understood that the foregoing description of a preferred embodiment of the invention has been presented for purposes of illustration and description and is not intended to limit the invention to the precise form disclosed. For example, the particular type of expanding gate valve may be other than shown and the actuator may use a different configuration of actuator piston such as a disc type or a different piston spring. Should it become necessary or desirable to adjust the actuator thrust, changes may be made in the diameter of the orifice through the hydraulic piston. Preferably, the hydraulic piston can be fitted with a replaceable plug having a different sized orifice rather than replacing the entire piston. Accordingly, it is to be appreciated that changes may be made by those skilled in the art without departing from the spirit of the invention.

What is claimed is:

1. A gate valve structure having a valve body with a valve chamber therein and a flow passage extending through said valve body and communicating with said valve chamber, an expandable gate assembly mounted within said valve chamber for movement in a collapsed condition between open and closed positions with respect to said flow passage, said gate assembly including a gate element and a segment which are expanded away from each other at said open and closed positions and are provided with ports which are aligned with one another and the flow passage in said open position, said gate element and segment being each provided with an outer planar sealing surface disposed parallel to one another for sealing against valve seats provided in said valve body at opposite sides of said gate assembly when the gate assembly is expanded in the open and closed positions, said valve body having a bore extending from the exterior of the valve body into said valve chamber;

pneumatic powered actuator means for moving said gate assembly transversely with respect to said flow passage between said open and closed positions, said actuator means comprising a housing mounted on said valve body and defining a piston chamber therewith;

a piston slidably received in the chamber, an actuator stem connected to said piston and movable therewith in the axial direction of said stem, said actuator stem extending through said bore and connected at one end to said gate assembly;

inlet means provided through the wall of said housing and adapted for connection to a source of pneumatic pressure whereby pressurized pneumatic fluid may be selectively admitted to the chamber on one side of the piston for urging the piston in one direction therein from one of said open or closed positions to the other;

compression spring means in said chamber for continuously urging the piston in the opposite direction from said one direction; and hydraulic choke means operably associated with said actuator stem for imposing a constant velocity control on said actuator piston substantially throughout the actuator stroke in both directions thereof for opening and closing the valve, said hydraulic choke means comprising a hydraulic cylinder mounted on said valve body in sleeved coaxial relation to said actuator stem, said actuator stem being adapted for axial reciprocal motion through said hydraulic cylinder, a hydraulic piston fixed to said actuator stem and mounted in said hydraulic cylinder for reciprocating motion therein, said hydraulic cylinder being filled with a hydraulic fluid, and means provided through said hydraulic piston for producing a throttling effect on the flow of hydraulic fluid from one side of the hydraulic piston to the other when said actuator piston is moved by pneumatic pressure or said spring means to thereby minimize the shock effect of the actuator stroke.

2. A gate valve as set forth in claim 1 wherein said hydraulic cylinder is filled with a hydraulic fluid which maintains substantially uniform viscosity throughout the temperature range of $-40°$ Centigrade to $204°$ Centigrade.

3. A gate valve as set forth in claim 1 wherein said actuator housing is provided with a second inlet means through the wall thereof which is adapted for connection to a source of pneumatic pressure whereby pressurized fluid may be selectively admitted to said chamber on the side of said piston opposite to that which is energized through said first inlet means for assisting the biasing force of said spring means.

* * * * *

UNITED STATES PATENT AND TRADEMARK OFFICE
CERTIFICATE OF CORRECTION

PATENT NO. : 4,535,967
DATED : August 20, 1985
INVENTOR(S) : Brett A. Babbitt, Tri C. Le & Bruce P. Noble It is certified that error appears in the above-identified patent and that said Letters Patent is hereby corrected as shown below:

Column 1, line 19, "charged" should be -- changed --.

Column 4, line 23, "uderside" should be -- underside --.

Signed and Sealed this

Twenty-eighth Day of January 1986

[SEAL]

Attest:

DONALD J. QUIGG

Attesting Officer

Commissioner of Patents and Trademarks